(12) United States Patent
Förster

(10) Patent No.: US 10,334,820 B2
(45) Date of Patent: Jul. 2, 2019

(54) METHOD FOR DISPLAYING INFORMATION ON AN ANIMAL AND FOR LOCATING AN ANIMAL

(71) Applicant: Förster-Technik GmbH, Engen (DE)

(72) Inventor: Thomas Förster, Engen (DE)

(73) Assignee: Förster-Technik GmbH, Engen (DE)

( * ) Notice: Subject to any disclaimer, the term of this patent is extended or adjusted under 35 U.S.C. 154(b) by 0 days.

(21) Appl. No.: 16/087,115

(22) PCT Filed: Mar. 21, 2017

(86) PCT No.: PCT/EP2017/056695
§ 371 (c)(1),
(2) Date: Sep. 21, 2018

(87) PCT Pub. No.: WO2017/162673
PCT Pub. Date: Sep. 28, 2017

(65) Prior Publication Data
US 2019/0098869 A1    Apr. 4, 2019

(30) Foreign Application Priority Data

Mar. 22, 2016 (DE) .................. 10 2016 105 272
Apr. 25, 2016 (DE) .................. 10 2016 107 624

(51) Int. Cl.
*A01K 11/00* (2006.01)
*A01K 29/00* (2006.01)

(52) U.S. Cl.
CPC .......... *A01K 11/006* (2013.01); *A01K 29/005* (2013.01)

(58) Field of Classification Search
CPC ....... A61B 5/746; A61B 5/024; A61B 5/0022; A61B 5/0205; A61B 5/0002;
(Continued)

(56) References Cited

U.S. PATENT DOCUMENTS 9,504,387 B2 * 11/2016 Alonsoperez Lanza ................
A61B 5/1112
9,538,729 B2 * 1/2017 Yarden ................ A01K 29/005
(Continued)

FOREIGN PATENT DOCUMENTS

DE       69501446 T2    8/1998
KR      101561429 B1    10/2015
(Continued)

OTHER PUBLICATIONS

International search report for application No. PCT/EP2017/056695 dated Jun. 1, 2017.
(Continued)

*Primary Examiner* — Mark S Blouin
(74) *Attorney, Agent, or Firm* — Bachman & LaPointe, PC

(57) ABSTRACT

A method for locating an animal on which a display apparatus is arranged, and/or for displaying information on the animal, wherein information which is to be displayed is activatable and/or adjustable in and/or on the display apparatus (2), wherein a specific display is assigned to an animal in order to identify animals for selection, wherein a pushbutton key on the display apparatus (2) is used for acknowledgement by a user, and wherein a counterweight (8) is assigned to the display apparatus (2).

15 Claims, 2 Drawing Sheets

(58) Field of Classification Search
CPC ... A61B 5/0816; A61B 5/742; A61B 5/02055; A61B 5/021; A61B 5/0402; A61B 5/7275
USPC ...................................................... 340/573.1
See application file for complete search history.

(56) References Cited

U.S. PATENT DOCUMENTS

| | | | |
|---|---|---|---|
| 10,080,348 B2 * | 9/2018 | Sharpe | A01K 29/005 |
| 10,085,419 B2 * | 10/2018 | Zimmerman | A01K 5/0107 |
| 2004/0233971 A1 | 11/2004 | Meads et al. | |
| 2015/0282457 A1 | 10/2015 | Yarden | |

FOREIGN PATENT DOCUMENTS

| | | |
|---|---|---|
| WO | 2011153571 A2 | 12/2011 |
| WO | 2014188273 A2 | 11/2014 |
| WO | 2015145422 A1 | 10/2015 |

OTHER PUBLICATIONS

International preliminary report on patentability for application No. PCT/EP2017/056695 dated Jun. 1, 2018.

* cited by examiner

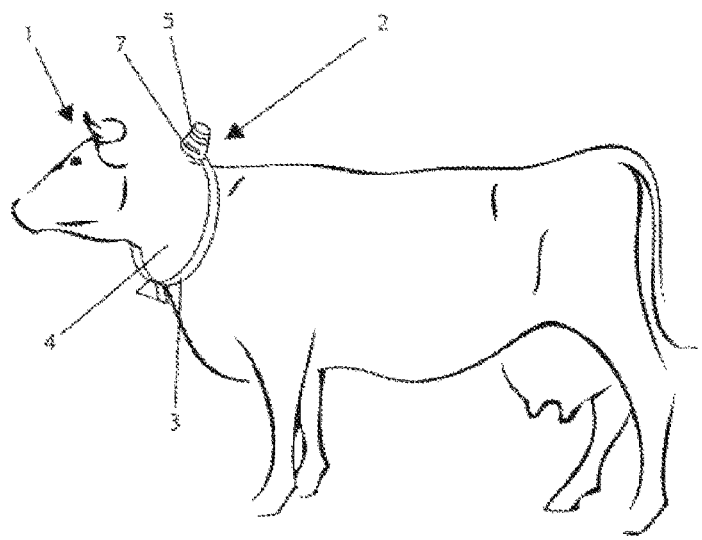
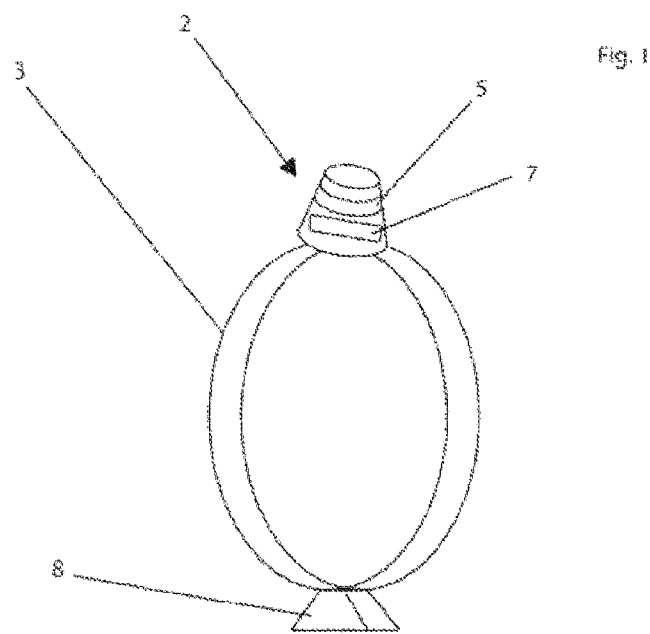

— METHOD FOR DISPLAYING INFORMATION ON AN ANIMAL AND FOR LOCATING AN ANIMAL —

BACKGROUND OF THE INVENTION

The invention relates to a method for locating an animal on which a display apparatus is arranged, and/or for displaying information on the animal.

PRIOR ART

Ear tags or else microchip transponders, for example also referred to as RFID chips, are known for identifying animals. However, if animals, e.g. calves, are kept in herds, in order to check the animal stock it is always important to be able to monitor the animals well and, for example, in an easily recognizable fashion. Simple conventional systems such as collars with numbers can be to a certain extent only recognized well from certain viewing angles or under adequate lighting conditions. In particular if individual animals are being sought, because e.g. the feed system, such as an automatic feeder, indicates said animals are conspicuous, it is difficult in a large herd of animals to find the affected animal or animals quickly. Even microchips are of little help here. It has previously been equally impossible, when assessing a herd of animals, to display easily and quickly important data for the evaluation of the animals, such as e.g. their health index, feed retrievals or movement data. Hitherto, users have had to rely, for example, on printouts or lists which, however, do not have a spatial association with the animals.

For example, DE 695 014 46 T2 presents a method and a device for measuring the degree of activity of animals, for example of cows or the like, wherein the primary objective is to recognize reliably and automatically the period when the animal is on heat (readiness for mating), which is characterized by additional activity.

Also known is WO 2014 188 273 A2, which discloses a sensor for detecting the physiological state of an animal. Furthermore, a system for localizing farm animals is known from WO 2015 145 422 A1. WO 2011 153 571 A2 discloses an animal tag which permits, for example, a body temperature measurement. US 2004 0 233 971 A1 discloses a temperature detection system for monitoring the health of large groups of animals. Furthermore, US 2015 0 282 457 A1 likewise discloses a system for monitoring the state of health of farm animals.

SUMMARY OF THE INVENTION

The problem addressed by the present invention is to make the identification and management of animals, in particular in a large herd of animals, simpler, more informative and more flexible. Further information, in addition to the identification information, e.g. from computer-controlled feed systems, is also to be capable of being displayed. The intension is also to acquire directly information on the animal which is intended to be provided to the user as a support for the animal management.

This problem is solved by virtue of the fact that information which is displayed on the animal by means of a display apparatus and which is activatable and/or adjustable is displayed on the animal.

The information which is to be displayed can be acquired by the display apparatus by means of sensors and/or transferred from a superordinate animal management system.

The display apparatus according to the invention can therefore, on the one hand, perform the function of both switching on or being able to adjust an identification display, e.g. the number of the animal. Of course, both are preferred within the scope of the present invention.

In one exemplary embodiment of the invention, it is conceivable that the display apparatus has e.g. a simple optical display. This can be a corresponding lamp or the like. If e.g. the user is searching for a corresponding animal, he enters a signal by means of a corresponding electronic device, e.g. by means of radio, to a herd of animals, which signal addresses the display apparatus of a certain animal, so that only this display apparatus causes the lamp to light up. The user therefore recognizes where the animal is located.

For example, a number of an animal which the user has previously assigned to the animal can also be triggered in the same way, so that the user recognizes whether the correct animal has also been addressed.

The scope of the present invention is also intended to include the fact that the information which the user transfers is changed by corresponding signals. For example, the number of the animal could be changed in this way. However, in particular in the case of relatively small herds of animals, manual activation of the display apparatus has also been considered, said activation bringing about e.g. a change in the identification of the animal. The number of the animal can be set by means of a DIP switch or the like on the display apparatus or else by means of close-range radio, such as NFC.

So that e.g. the number of the animal can also be recognized from all viewing directions, in one exemplary embodiment the display apparatus has a numerical light strip or the like.

In addition, corresponding electronic components, which comprise at least one transmitting part and one receiving part and the display possibilities as well as corresponding power supplies, are to be assigned to the display apparatus.

The display apparatus is preferably attached to a collar, since the visibility of the display appears to be ensured here. However, the invention is not intended to be restricted thereto, and arrangement at other positions on the body is also conceivable. It can also be expedient to present the display on a left-hand and right-hand side of the collar. The display apparatus can be fixedly connected to a flexible collar and therefore easily attached to the animal. For example in the case of arrangement on the neck, it is, of course, possible also to assign a counterweight to the display apparatus, which counterweight is intended to ensure that the display apparatus is always located on the neck in a clearly visible way. It is also possible to attach the display apparatus in an adhesive fashion to the animal, similarly to a plaster.

Furthermore, it has been considered to attach the display apparatus to the inside and/or outside of the ear, in a way corresponding to an ear tag. The advantage here is that if, for example the animal is still growing, it is not necessary for the owner of the animal to perform re-adjustment, which would possibly be necessary in the case of a collar.

It has also been considered that not only the number of the animal but also e.g. also the percentage retrieval of a quantity of feed or drink is displayed at the user's request. As a result, during the checking of animals, the user can quickly determine the feed status of the animal or recognize said status, inter alia as indications of the health status. In this case the user will pay particular attention to animals which indicate a low percentage of retrievals of the quantity of feed or drink. Alternatively, it would also be possible here to display only animals which are below a certain threshold value. These data items come directly or indirectly from e.g. a computer-controlled automatic feeder which knows the feed retrievals of the animals and places them in a ratio with the maximum permitted quantity. It is also possible to display other values which are determined either by the automatic feeder or by the sensor system of the display apparatus. Examples are the sucking rate, the age, the stabling date, abortions, residual quantities, handling status, health index, movement data.

The display for the electronic display apparatus could be a power-saving e-paper display.

It has also been considered not to display this information numerically but rather by means of color coding, e.g. similarly to a lamp. The adjustable color could be displayed on a lamp or a basic coloration of the entire collar could be changed. Green could then stand for 80% and more retrieval of feed, yellow for 50-80% and red for below 50%. Consideration has also been given to approximately infinitely adjustable gradation of the color. For this purpose, it would also be possible to attach flexible or non-flexible light guides in the display unit, which light guides are lit up with an adjustable RGB-LED and therefore generate a relatively large visible area.

In the exemplary embodiment in the form of an ear tag, the display lamp could be arranged centrally in the ear tag, in order to ensure the easiest possible recognition by the user. In this case there is also provision to equip what is referred to as an ear tag spike with transparent or translucent material, which ear tag spike is normally drawn through the ear and engaged in the actual ear tag in order to fasten said ear tag. The main lamp/LED or auxiliary lamp/LED of the display apparatus is then arranged in such a way that light which is emitted by it is input into the ear tag spike and can be perceived on all faces, even on a planar end face of the ear tag spike. In this example, the display apparatus is attached in the interior of the ear and the display lamp is also located there, e.g. with an adjustable color or flashing frequency. By means of the light-guiding ear tag spike it is then also possible to perceive the display simultaneously on the outside of the ear. This is helpful, in particular, if the observer is standing behind the animal, or the animal is looking away from the user.

The light intensity of the display could also be variable, in order e.g. to achieve good visibility even when there is a high level of solar radiation and, on the other hand, save current, for example in the case of poor ambient light. For this reason consideration has also been given to making it possible for the user to set the desired light intensity, or for this to take place automatically, e.g. by means of light intensity sensors, e.g. in the display unit or at a central location in the shed.

In one preferred exemplary embodiment of the invention, a sensor system is also to be integrated into the display apparatus. For example, acceleration in three axes is to be detected by means of this sensor system. If e.g. the display apparatus is arranged on a collar on an animal's neck, the sensor system is intended to detect the movement of this neck and of the animal. Overall, the health status and wellbeing status of the animal can be determined by means of acceleration sensors. There is also provision for the current activation to be detected by means of characteristic movement profiles, e.g. lying, running, eating, drinking. By means of precise analysis of the movements, e.g. swallowing movements, it is to be possible to determine recorded quantities of water, milk or feed. Furthermore, consideration has been given to integrating a microphone, temperature sensor, step counters or a sensor system for ascertaining the walking distance triangulation for the determination of positions.

Consideration has also been given to making it possible for the display apparatus to communicate with other sensors which are attached to the animal, such as e.g. a bolus in the rumen.

The values of the integrated sensors are processed or partially pre-processed either directly in the display unit or transmitted completely to the superordinate system. The sensor data are preferably transmitted by radio and displayed to the user and/or also stored for later evaluations, e.g. in a cloud memory. Consideration has also been given to displaying these sensor data items in a connected automatic feeder, in order to be able to provide the user with a better picture of the animal in combination with values which the user determines himself.

In particular, the following can be determined by means of the sensor system.

Detection of the activity of the animal as an indicator of its "health", detection of sensor signals which indicate an activity, such as eating, drinking, chewing the cud etc., in order thereby to detect the times of individual activities or also the quantities consumed during the eating or drinking, detecting evaluation patterns which indicate the animal is on heat, detecting sensor signals which indicate sicknesses such as coughs, by means of a position detection process, the current location of the animal can be indicated directly to the user. In this context, it is also possible to infer the time present and quantity consumed at feed points and drinking points by means of the animal's presence at specific "locations". By means of the integration of the positions it would also be possible to infer a distance traveled, which indicates illnesses, in particular in respect of the change compared to the previous days, or to the animal being on heat, a "completion message", e.g. the execution of a treatment or of subsequent treatments, could be activated directly on the animal with a remote signal or a pushbutton key or some other sensor which is activated directly by the user, such as e.g. a Hall sensor which is operated by magnet, directly on the display apparatus.

According to the present invention consideration has also been given to making it possible for a treatment list of animals which is produced in advance to be retrieved and worked through.

It is possible to display only the corresponding animals, e.g. a specific display can also be assigned to an animal, in order e.g. to identify animals for selection. After the animal has been treated in situ, the aforementioned pushbutton key on the display apparatus can be used for acknowledgement by the user. Correspondingly, the display for the treatment could then be extinguished for this animal.

The method according to the invention can be carried out by means of any desired known electronic systems, in particular by means of corresponding computers, laptops, tablets or smartphones, but it is also possible to perform control by means of known automatic feeders which are connected to the display apparatuses e.g. by radio and data which, when desired, are retrieved by the user.

The communication of the user and his smartphone or permanently installed operator control units could also be carried out indirectly via a gateway which communicates on the one hand with modern smartphones, e.g. by means of WLAN and, on the other hand, with the inventive display apparatus on the animal in the sub-GHz range. This gateway could also be integrated into the Internet. Data can therefore be easily made available for Cloud applications and/or retrieved therefrom.

In one particular exemplary embodiment of the invention, consideration has been given also to installing an energy harvesting system on the collar or the display apparatus, which means the corresponding energy supply means, such as, for example, batteries, are re-charged by the animal's movement.

The display apparatus can also additionally have an RFID transponder which is customary in the field of animals and which is recognized only in an automatic feed station, e.g. owing to its limited range. The display apparatus with the corresponding displays is therefore responsible for the management of an entire stock of animals, and the RFID transponder in particular for the transfer of data to feed systems. It is also conceivable to integrate the RFID transponder in the display apparatus.

According to the present invention, consideration has also been given to making it possible for a treatment list of animals which has been produced in advance to be retrieved and worked through. It is possible to display only the corresponding animals, e.g. it is also possible to assign a specific display to an animal, in order e.g. to identify animals for selection. After the animal has been treated in situ, the aforementioned pushbutton key on the display apparatus can be used for acknowledgement by the user. Correspondingly, the display for the treatment could also be extinguished for this animal.

In a further embodiment consideration has been given to achieving the same display functions in conjunction with resources from what is referred to as "augmented reality". For example, the user could film a herd of animals by means of a smartphone and the rear view camera thereof and look on the display. The animals are displayed there as live video and at the same time computer-generated text is displayed for the animals, e.g. above their heads, with the information of interest, such as the number of the animal, retrieval of feed in liters, stabling date etc. Instead of using a smartphone held in the hand, consideration has also been given to using what are referred to as data glasses, such as e.g. Google Glass or Microsoft HoloLens. The information about the individual animals is in turn retrieved from a central location, such as a Cloud or from automatic feeders.

For the functioning of the described "augmented reality" it is necessary to recognize the animals, as it were, in real time so that the data can be assigned to them on the display. This recognition can be achieved by means of image recognition of individual features of animals such as size, coloration of the skin, or of attached identification features such as ear tags or collars. A combination with the collar according to the invention or the display unit on the animal is also conceivable. Here, the display unit on the respective animal will output an individual code which is easily recognized by the augmented reality device. This is, for example, a flashing code of a lamp or a specific coloring of the lamp or of the entire collar. It is therefore possible to easily detect a plurality of animals simultaneously, while the user is provided with further information on the respective animals via the augmented reality.

Alternatively, consideration has been given to the fact that in the display unit according to the invention, which is attached to the animal, sensors are attached (directly or indirectly) in order to determine the position of the respective animal precisely in the shed. The augmented reality device knows its "viewing direction" relative to the shed by virtue of the detection of its own position and can display information on the animals in the display on the basis of their known positions. Even if the display function of the display unit were to be limited in this example to supporting the augmented reality device, the other sensors which are present in the display unit are advantageous for effective animal management or health management; the values thereof would also be displayed in the augmented reality device after said values have been transferred by radio to said device or indirectly to a superordinate system.

In a further embodiment consideration has been given to making it possible for information to be provided to the animal itself, e.g. if a new feed ratio is ready for retrieval. For this purpose, e.g. a signal can be sent to the display unit according to the invention by radio. An optical, acoustic or mechanical signal, to which the animal has been trained, is output there. The mechanical signal could be, for example, a vibration motor which is integrated into the display unit.

DESCRIPTION OF THE FIGURES

Further advantages, features and details of the invention can be found in the following description of preferred exemplary embodiments as well as with reference to the drawing, in which:

FIG. 1 shows a side view of an animal with a device according to the invention in a position of use;

FIG. 2 shows a perspective view of an exemplary embodiment of the device according to the invention for locating an animal.

DETAILED DESCRIPTION

Figure 3:
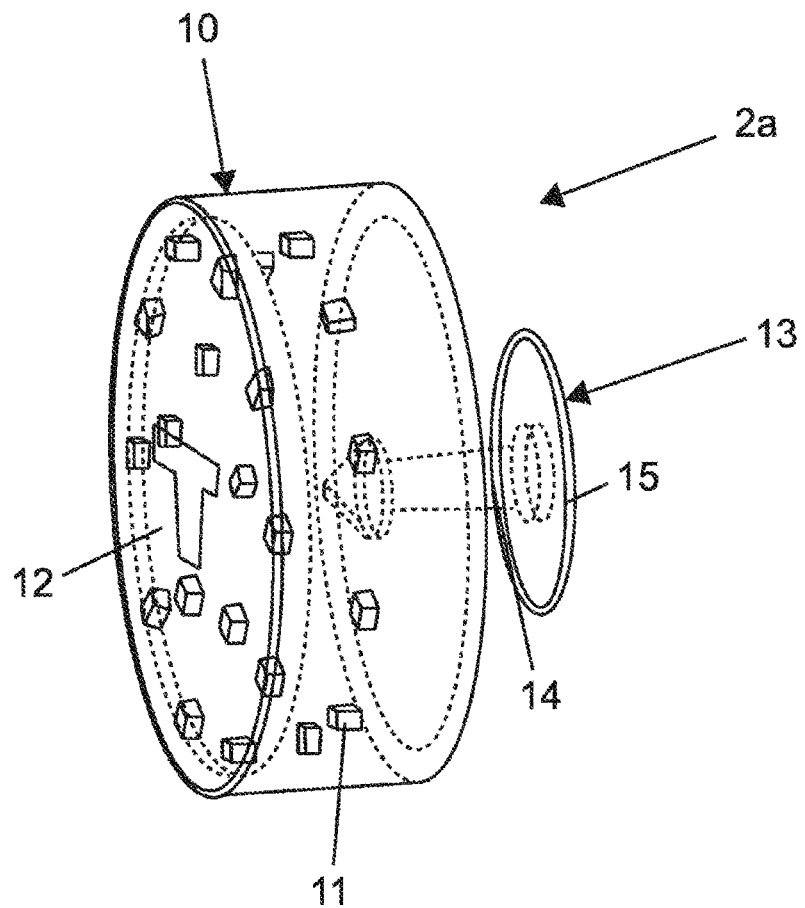
FIG. 3 shows a perspective view of a further exemplary embodiment of a display apparatus according to the invention.

According to FIG. 1, an animal 1, in this preferred exemplary embodiment a cow, is shown which is wearing a collar 3 with a display apparatus 2 for locating or identifying said animal 1. The collar 3 is preferably fastened around the neck 4 of the animal 1.

The present display apparatus 2 is intended, when triggered by means of an action of, for example, the user of a smartphone, to identify individual animals temporarily or continuously, e.g. in that a lamp 5 and/or a numerical display 7 on the display apparatus 2 lights up. For this purpose, the display apparatus 2 should be directly or indirectly connected to the user via a radio link. Accordingly, the display apparatus 2 has an electronic part with a power supply and a radio part and a display facility. The lamp 5 and the numerical display 7 are preferably to be equipped with LEDs, in order to be economical in terms of energy.

Furthermore, a number of technical components, such as for example various sensors for movements and the state of health of the animal, an RFID chip for the detection of the animal, and a transmitter unit, for transmitting all the data to a superordinate system (not shown in more detail) which a user can monitor, are to be integrated into the display apparatus 2. A computer or else a smartphone can serve as the superordinate system. An NFC chip or an internal WLAN can serve to transfer the signal.

The user is therefore informed about all the activities of the animal 1 and can, for example in the case of anomalies, transmit a signal which activates the lamp 5 on the animal's collar 3. The animal 1 is therefore easier to find.

Furthermore, according to FIG. 2 consideration is given to a counterweight 8 for the display apparatus 2 on the collar 3, so that the display apparatus 2 and, in particular, also the numerical display 7 are located at the top on the neck 4 of the animal 1.

According to FIG. 3, a further exemplary embodiment of an inventive display apparatus 2a is configured as an ear tag. In a corresponding housing there are a multiplicity of diodes 11 which, in interaction with a color carrier 12, generate a colored light. Of course, other displays such as symbols, numbers, letters or the like can also be illuminated. A flashing frequency is also conceivable.

It is advantageous here in particular that an ear tag spike 13 composed of a spike 14 and a planar end face 15 is preferably manufactured from transparent plastic. The display apparatus 2a is secured to an ear of the animal with this ear tag spike 13 by punching the spike 14 through the animal's ear and engaging it in the housing 10. Therefore, for example a specific color can be emitted not only by the housing 10 but also by the ear tag spike 13, so that this color is recognized even behind the animal's ear.

LIST OF REFERENCE NUMBERS

1 Animal
2 Display apparatus
3 Collar
4 Neck
5 Lamp
6
7 Numerical display
8 Weight
9
10 Housing
11 Light-emitting diode
12 Color carrier
13 Ear tag spike
14 Spike
15 End face

The invention claimed is:

1. A method for locating an animal on which a display apparatus is arranged, and/or for displaying information on the animal, wherein information which is to be displayed is activatable and/or adjustable in and/or on the display apparatus (2), wherein a specific display is assigned to an animal in order to identify animals for selection, wherein a push-button key on the display apparatus (2) is used for acknowledgement by a user, and wherein a counterweight (8) is assigned to the display apparatus (2).

2. The method as claimed in claim 1, wherein the information is set by means of a transferred signal.

3. The method as claimed in claim 1, wherein the visibility of the information is controlled by means of a transferred signal.

4. The method as claimed claim 1, wherein acknowledgement is transferred to a superordinate system by means of manual activation on the display apparatus (2).

5. The method as claimed in claim 1, wherein a selection of animals (1) is processed or a work flow is implemented.

6. The method as claimed in claim 5, wherein the state of the animal (1) is assessed by means of suitable sensors in and/or on the display apparatus (2).

7. The method as claimed in claim 1, wherein the display apparatus (2) buffers data and/or transfers it to a superordinate system.

8. The method as claimed in claim 1, wherein a signal is output to the animal by means of suitable actuators on the display apparatus (2).

9. A device for locating an animal on which a display apparatus (2) is arranged, and/or for displaying information on the animal, wherein a display which is activatable and/or adjustable is provided in and/or on the display apparatus (2), and wherein a counterweight (8) is assigned to the display apparatus (2).

10. The device as claimed in claim 9, wherein information which is adjustable by means of a coding switch is provided in and/or on the display apparatus (2).

11. The device as claimed in claim 9, wherein an identification which is adjustable by transferring signals is provided in and/or on the display apparatus (2).

12. The device as claimed in claim 9, wherein a visible number is provided in and/or on the display apparatus (2).

13. The device as claimed in claim 9, wherein a push-button key or the like is provided in and/or on the display apparatus (2).

14. The device as claimed in claim 9, wherein the display apparatus (2) is arranged on a band which is wrapped around part of the body of the animal.

15. The device as claimed in claim 9, wherein the display apparatus (2) buffers data and/or transfers data to a superordinate system.

* * * * *